United States Patent
Brown et al.

(10) Patent No.: US 8,090,409 B2
(45) Date of Patent: *Jan. 3, 2012

(54) SYSTEM AND METHOD TO PROVISION A MOBILE DEVICE

(75) Inventors: Michael K. Brown, Kitchener (CA); Michael Kirkup, Waterloo (CA); Michael S. Brown, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/721,701

(22) Filed: Mar. 11, 2010

(65) Prior Publication Data

US 2010/0159876 A1 Jun. 24, 2010

Related U.S. Application Data

(63) Continuation of application No. 11/457,546, filed on Jul. 14, 2006, now Pat. No. 7,711,392.

(51) Int. Cl.
*H04M 1/00* (2006.01)
*H04B 1/38* (2006.01)

(52) U.S. Cl. ..... 455/558; 455/410; 455/411; 455/412.1; 455/418; 455/420; 455/41.2; 455/500; 455/502; 455/557; 709/211; 709/212; 709/216; 713/182; 713/183; 713/184

(58) Field of Classification Search .......... 455/410–411, 455/412.1, 418–420, 41.2, 500, 502, 557–558; 709/211–216; 713/182–184
See application file for complete search history.

(56) References Cited

U.S. PATENT DOCUMENTS

| | | | | |
|---|---|---|---|---|
| 6,134,660 A * | 10/2000 | Boneh et al. | ................. | 713/193 |
| 7,107,043 B2 * | 9/2006 | Aoyama | .................. | 455/412.1 |
| 7,146,161 B2 * | 12/2006 | Chou | ........................... | 455/418 |
| 7,349,719 B2 * | 3/2008 | Buniatyan | ..................... | 455/557 |
| 7,548,748 B2 * | 6/2009 | Dunko et al. | ................ | 455/419 |
| 2004/0116155 A1 * | 6/2004 | Aisenberg | ..................... | 455/558 |
| 2004/0235514 A1 * | 11/2004 | Bloch et al. | ............... | 455/550.1 |

(Continued)

FOREIGN PATENT DOCUMENTS

EP 1191767 3/2002

(Continued)

OTHER PUBLICATIONS

"Sony Ericsson W800i", 2005 Sony Ericsson AB, XP002413530, Retrieved from the Internet: URL: http://www.sonyericsson.com/downloads/W8001_UG_AddOn2_R1a_EN.pdf, pp. 80, 81. European Search Report dated Jan. 8, 2007.

*Primary Examiner* — Tuan A Tran
(74) *Attorney, Agent, or Firm* — Ridout & Maybee LLP (57) ABSTRACT

A system and method for enabling functions on a primary mobile device from a secondary mobile device are described. The primary mobile device is configured to enable at least selected functions of the mobile communications device if authorization information is received at the primary mobile device at periodic intervals of time. The method comprises: storing at the secondary mobile device the authorization information; establishing a short range direct wireless communications link between the secondary mobile device and the primary mobile device; and periodically transmitting the authorization information to the primary mobile device to enable the at least selected functions of the mobile communications device.

18 Claims, 6 Drawing Sheets

U.S. PATENT DOCUMENTS

2004/0235523 A1 * 11/2004 Schrire et al. ................ 455/558

FOREIGN PATENT DOCUMENTS

| | | |
|---|---|---|
| GB | 2378854 | 2/2003 |
| WO | WO01/61973 | 8/2001 |
| WO | WO02/063576 | 8/2002 |
| WO | WO2004/025933 | 3/2004 |
| WO | WO2004/091229 | 10/2004 |

* cited by examiner

SYSTEM AND METHOD TO PROVISION A MOBILE DEVICE

RELATED APPLICATION DATA

This application is a continuation of U.S. patent application Ser. No. 11/457,546, filed Jul. 14, 2006, which is incorporated herein by reference in its entirety to provide continuity of disclosure.

TECHNICAL FIELD

The present application relates generally to mobile devices and, more specifically, to a system and method for provisioning a mobile device.

BACKGROUND

The mobile device market is currently experiencing explosive growth as mobile devices evolve to deliver increasingly critical services such as organizational planning, wireless telephone, email, Internet browsing, and related services. However, conventional portable devices synchronize with a personal computer such as a desktop computer, typically through a cradle or wired connection. If the user's data that is stored on the mobile device becomes corrupted or inaccessible while the user is away from his computer or on a business trip, the user is not able to access the user's data until such time as the user returns to his or her computer and can synchronize the mobile device with the computer to restore the data. Additionally, information critical to wireless services used by the mobile device may become corrupted, thus cutting off communication to and from the mobile device. In a best case scenario, the user must then contact a system administrator to retrieve a password that can be used to initiate a wireless synchronization process, or other instructions on how to repair the device.

Accordingly, a portable system that provides for the ability for on-the-fly backup and restore of critical data is desired.

BRIEF DESCRIPTION OF THE DRAWINGS

Reference will now be made to the drawings, which show by way of example, embodiments of the present disclosure, and in which.

In the drawings, like reference numerals denote like elements or features.

DETAILED DESCRIPTION OF EXAMPLE EMBODIMENTS

According to one example embodiment is a mobile device authorization system comprising a primary mobile device and a secondary mobile device. The primary mobile device includes: a primary device controller including at least one processor, for controlling operation of the primary mobile device; a primary device display coupled to the primary device controller for displaying information; a primary device user input device coupled to the primary device controller; a primary device communications system for exchanging signals with a wireless network; and a primary device short range communications system coupled to the primary device controller. The secondary mobile device includes a secondary device controller including at least one processor, for controlling operation of the secondary mobile device; a secondary device storage element coupled to the secondary device controller for storing authorization information for authorizing a designated user to use at least selected functions of the primary mobile device; and a secondary device short range communications system coupled to the secondary device controller for exchanging signals with the primary device short range communications system. The primary device controller and the secondary device controller are collectively operable to establish a communication link between the primary and secondary mobile devices through the primary device short range communications system and the secondary device short range communication system. The secondary device controller is operable to periodically transmit the authorization information to the primary mobile device. The primary device controller is operable to enable the at least selected functions of the primary mobile device if the authorization information is received at periodic intervals of time.

According to another example embodiment is a method for enabling functions on a primary mobile device from a secondary mobile device. The primary mobile device is configured to enable at least selected functions of the mobile communications device if authorization information is received at the primary mobile device at periodic intervals of time. The method comprises: storing at the secondary mobile device the authorization information; establishing a short range direct wireless communications link between the secondary mobile device and the primary mobile device; and periodically transmitting the authorization information to the primary mobile device to enable the at least selected functions of the mobile communications device.

According to another example embodiment is a method for enabling functions on a mobile device that is enabled to communicate over a wireless network. The mobile device is configured to enable at least selected functions of the mobile communications device if authorization information is received at the primary mobile device at periodic intervals of time. The method includes: providing a mobile smart card reader that has a removable memory card and that is enabled to communicate with the mobile device over a direct smart card reader to mobile device wireless communications path, the memory card having stored thereon authorization information for a user of the mobile device; storing at the smart card reader the authorization information; establishing a communications session directly between the smart card reader and the mobile device over the wireless communications path; and periodically transmitting the authorization information to the mobile device.

Figure 1:
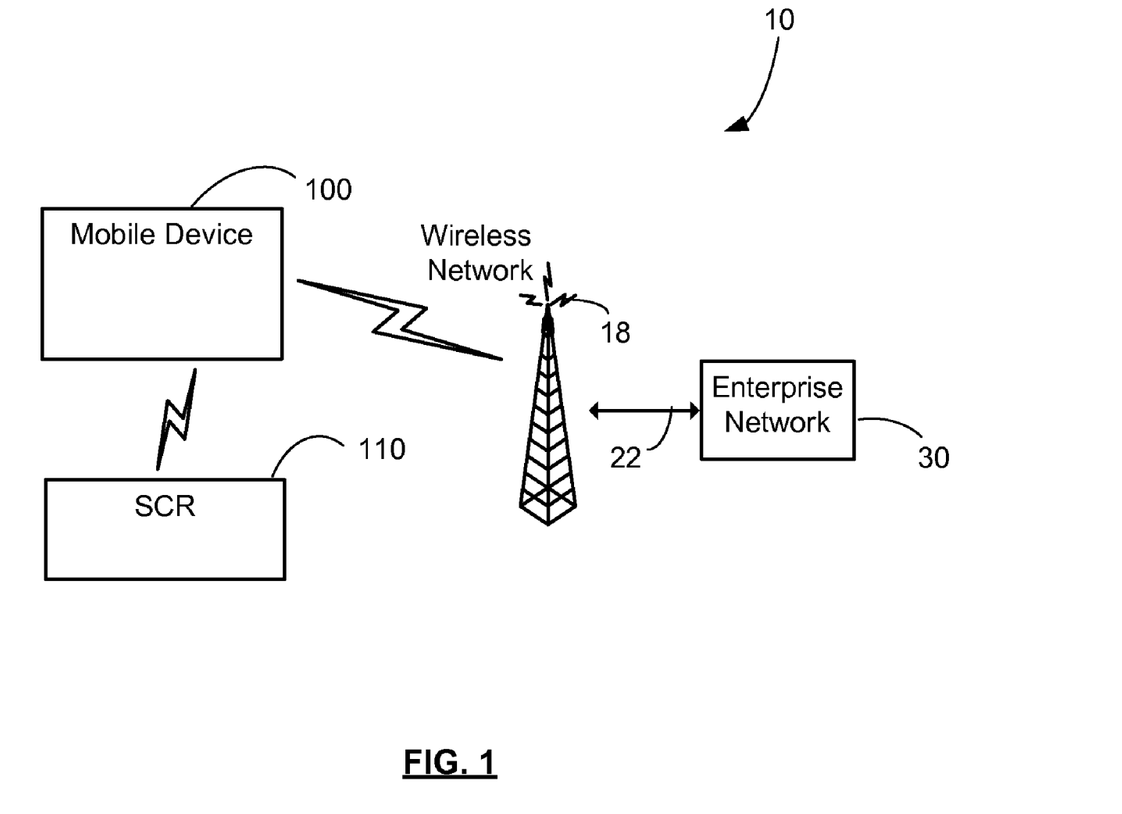
FIG. 1 shows in block diagram form a communication system suitable for an electronic device in accordance with one embodiment.

Reference is made to FIG. 1, which shows an example of a communication system 10 that includes one or more mobile devices 100 (only one of which is shown in FIG. 1) that are enabled to communicate with one or more wireless networks 18. The wireless network 18 may be implemented as a packet-based cellular network that includes a number of base stations each providing wireless Radio Frequency (RF) coverage to a corresponding area or cell. For example the wireless network 18 could conform to one or more of the following, among other things: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) or various other third generation networks such as EDGE (Enhanced Data rates for GSM Evolution) or UMTS (Universal Mobile Telecommunications Systems), or various other 3.5 G networks such as HSPDA (High-Speed Downlink Packet Access).

In some embodiments, instead of or in addition to a wide area wireless network, network 18 can include a local wireless area network, such as for example a wireless local area network that conforms to IEEE 802.11 standards such as 802.11b and/or 802.11g. In at least some example embodiments, the wireless network 18 is connected through intermediate communications links 22, including for example the Internet, to one or more enterprise networks 30 each associated with respective mobile devices 100, such that the mobile devices 100 are each enabled to exchange electronic messages and other information with the enterprise networks that they are associated with.

At least some of the mobile devices 100 have a further associated secondary mobile device in the form of a smart card reader (SCR) 110.

Figure 2:
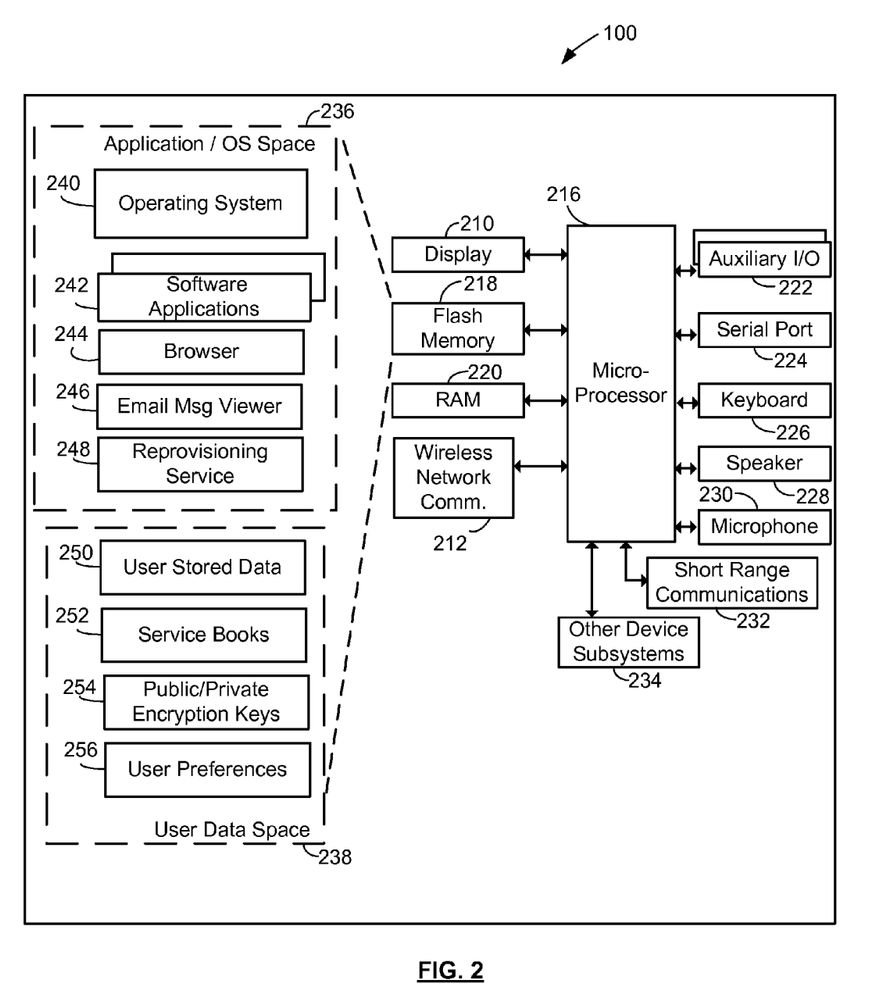
FIG. 2 shows in diagrammatic form a mobile device according to one embodiment.

Reference is next made to FIG. 2, which shows in greater detail an embodiment of the mobile device 100. The mobile device 100 includes a display sub-system 210, a wireless network communication subsystem 212 for two-way communications with the wireless network 18 (FIG. 1). According to one embodiment, the communications subsystem 212 includes antennas (not shown), RF transceivers (not shown), and some signal processing capabilities, implemented, for example, by a digital signal processor (not shown). The mobile device 100 also includes a controller in the form of at least one microprocessor 216 which is suitably programmed to control the overall operation and functions of the mobile device 100, which are described in more detail below. The mobile device 100 includes peripheral devices or subsystems such as a flash memory 218, a random access memory (RAM) 220, an auxiliary input/output (I/O) subsystem 222 (e.g., a scrollwheel), a serial port 224 (e.g., a USB port), an input device 226 (e.g., a keyboard or keypad), a speaker 228, a microphone 230, a short-range communications subsystem 232 (e.g., an infrared transceiver, wireless bus protocol such as a Bluetooth™ system, or any other means of local wireless communications), and any other device subsystems generally designated by reference 234.

The microprocessor 216 operates under stored program control with code or firmware being stored in the flash memory 218 (or other type of non-volatile memory device or devices). As depicted in FIG. 2, the flash memory 218 is logically partitioned into two separate spaces, an application and operating system space 236 and a user data space 238. The application and operating system space 236 includes stored programs (e.g., firmware) including an operating system program or code module 240 and other programs or software applications indicated generally by reference 242. The software applications 242 can for example include a Web browser 244 and an email message viewer 246.

According to example embodiments, the software applications 242 of the mobile device 100 further include a reprovisioning service 248 that may be used to backup and/or restore data from the RAM 220 and/or the flash memory 218 (e.g., either the application and operating system space 236 or the user data space 238) to the smart card reader 110 shown in FIG. 1 and described in more detail below in connection with FIG. 3. The functioning of the reprovisioning service 248 will be described in greater detail below in connection with FIGS. 4, 5, and 6. The user data space includes data stored in the flash memory 218 by the microprocessor 216 related to the user or owner of the mobile device 100. Examples of data stored in the user data space include user stored data 250 (e.g., documents or data generated and saved by the user when using the software applications 242 or documents or data downloaded by the user through the network 18, or through port 318, or short range communications sub-system 320), service books 252 (e.g., routing information enabling the mobile device 100 to communicate with the enterprise network 30 and/or wireless network 18 and access various data services such as e-mail, web browsing, instant messaging, etc.), public or private encryption keys 254 (e.g., S/MIME or PGP information granting the user the ability to secure his or her communications with other users and with various servers and services), and user preferences 256 (e.g., preferences related to the usage of and stored by the software applications 242 and preferences related to any aspect of the operation of the mobile device 100). The operating system code 240, code for specific device applications 242, or code components thereof, or any of the user data contained in the user data space 238 may be temporarily loaded into a volatile storage medium such as the RAM 220 during operation of the mobile device 100. Received communication signals and other data with information may also be stored in the RAM 220. In some embodiments, the mobile device 100 may include in addition to an internal flash memory 218 persistent memory carried on a SIM (Subscriber Identity Module) card or other removable device, and at least some of the user data space 238 may be allocated to the SIM card flash memory.

The stored program control (i.e., software applications 242) for the microprocessor 216 also includes a predetermined set of applications or code components or software modules that control basic device operations, for example, data and voice communication applications which are normally installed on the mobile device 100 as the software applications 242 during the manufacturing process. Further applications may also be loaded (i.e., downloaded) onto the mobile device 100 through the operation of networks described above for FIG. 1, the auxiliary I/O subsystem 222, the serial port 224, or the short-range communications subsystem 232. The downloaded code module or components are then installed by the user (or automatically) in the RAM 220 or the non-volatile program memory (e.g. the flash memory 218).

The serial port 224 comprises a USB type interface port for interfacing or synchronizing with another device, such as, a desktop computer (not shown). The serial port 224 is used to set preferences through an external device or software application. The serial port 224 is also used to extend the capabilities of the mobile device 100 by providing for information or software downloads, including user interface information, to the mobile device 100 other than through a wireless communication network, described above for FIG. 1. In one embodiment, the serial port 224 may be used to communicate with the smart card reader 110.

The short-range communications subsystem 232 provides an interface for communication between the mobile device 100 and other devices, including the smart card reader 110, to be described in greater detail in connection with FIG. 3, below. For example, the subsystem 232 may comprise an infrared communication link or channel, a wireless bus protocol such as a Bluetooth communications subsystem, or any other localized wireless means of communication.

Figure 3:
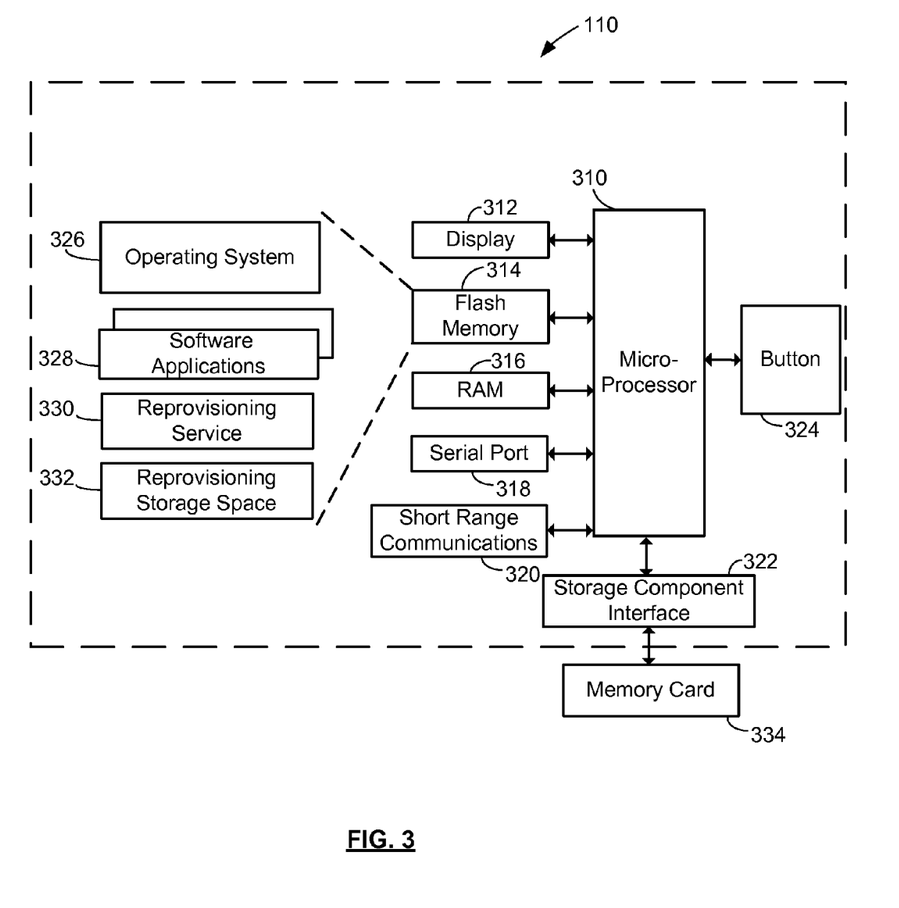
FIG. 3 shows in diagrammatic form one embodiment of a smart card reader for use with the mobile device shown in FIG. 2.

Reference is next made to FIG. 3, which shows in greater detail an example embodiment of a secondary mobile device, namely smart card reader 110. The smart card reader 110 includes a controller including at least one microprocessor 310, which is suitably programmed to control the overall operation and functions of the smart card reader 110, and an output device 312 (e.g., a display module). The smart card reader 110 further includes peripheral devices or subsystems such as a flash memory 314, a random access memory (RAM) 316, a serial port 318 (e.g., a USB port), a short-range communications subsystem 320 (e.g., an infrared transceiver, wireless bus protocol such as a Bluetooth system, or any other means of local communications), a storage component interface 322 (e.g., for a memory card or any other data storage device), and an input device 324 (e.g., a push button).

The microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software applications indicated generally by reference 328. The software applications 328 of the smart card reader 110 further include a reprovisioning service 330 that may be used to backup data from and/or restore data to the mobile device 100 shown in FIG. 2. The operating system code 326, code for specific device applications 328, code for the reprovisioning service 330, or code components thereof, may be temporarily loaded into a volatile storage medium such as the RAM 316. Received communication signals and other data with information may also be stored in the RAM 316. The flash memory 314 may also contain space allocated to storage space for the reprovisioning service, indicated by reference 332. Additionally, the storage component interface 322 receives a removable memory card 334, providing additional storage space for the smart card reader 110. In one embodiment, the memory card 334 may be a smart card similar to the smart cards known to those skilled in the art. The functioning of the reprovisioning service 330 will be described in greater detail in relation to FIGS. 4, 5, and 6, below. While operation of the smart card reader 110 is described using a smart card, it will be understood by those skilled in the art that the smart card reader 110 may be designed using any suitable form of removable media without departing from the intended scope of the smart card reader 110.

The stored program control (i.e., software applications 328) for the microprocessor 310 also includes a predetermined set of applications or code components or software modules that control basic device operations, for example, management and security related control of the data of the smart card reader 110 and may be installed on the smart card reader 110 as a component of the software applications 328 during the manufacturing process. Further applications may also be loaded (i.e., downloaded) onto the smart card reader 110 through the operation of the serial port 318, the short-range communications subsystem 320, or from the memory card 334. The downloaded code module or components are then installed by the user (or automatically) in the RAM 316 or the non-volatile program memory (e.g., the flash memory 314).

The serial port 318 comprises a USB type interface port for interfacing or synchronizing with another device, such as, a desktop computer (not shown), or the mobile device 100 (FIG. 2). The serial port 318 is used to set preferences through an external device or software application or exchange data with a device such as the mobile device 100 to be stored on the memory card 334 that is plugged into the storage component interface 322 of the smart card reader 110. The serial port 318 is also used to extend the capabilities of the smart card reader 110 by providing for information or software downloads, including any user interface information, to the smart card reader 110.

The short-range communications subsystem 320 provides an interface for communication between the mobile device 100 and the smart card reader 110. In one embodiment, the short-range communications subsystem 320 includes an infrared communication link or channel. In another embodiment, the subsystem 320 comprises a wireless RF bus protocol such as a Bluetooth communications subsystem. However, the short-range communications subsystem 320 may comprise any suitable local wireless means of communication, so long as the short range communications subsystem 232 of the mobile device 100 (FIG. 2) is chosen to operate using the same protocol, thereby facilitating wireless communication between the mobile device 100 and the smart card reader 110. Any communications mechanism and/or protocol may be implemented for the short range communications subsystems 320 and 232, so long as the mobile device 100 and the smart card reader 110 can communicate with each other when within physical proximity.

In some embodiments, for enhanced security purposes, a mobile device 100 must be in at least periodic communication with its associated smart card reader 110 through short range communications system 232 to receive authorization information stored on the smart card 334 in order for a user to use some or all of the functionality of the mobile device 100. The authorization information stored on the smart card will typically include unique information for a designated user of the mobile device 100. Such a configuration mitigates against unauthorized use of a mobile device 100 that becomes separated (i.e. out of communications range) from its associated smart card reader 110. According to example embodiments, in addition to providing the enhanced security functionality, the smart card reader 110 is also used to backup data to provision its associated mobile device 10, as will be described in greater detail below.

Referring now to both FIGS. 2 and 3, during normal operation of the mobile device 100, the flash memory 218 provides a secure and reliable means of storage for the application and operating system space 236 and the user data space 238 provided therein. The application and operating system space 236 is particularly reliable since this logical partition of the flash memory 218 is typically subject to strict access rules by the software applications 242 and by the user. The application and operating system space 236 may even be designated as read only, thereby bolstering the integrity of the data contained therein. However, occasionally, the user may find that the data stored in the user data space 238 has become erased or corrupted. Alternatively, the microprocessor 216 may automatically determine that some of the contents of the user data space 238 has become improperly erased or corrupted. For example, this may occur due to accidental deletion, a bug in one of the software applications 242, a coded virus, malicious use by another user, or an erase-data command received from the system administrator in order to prevent unauthorised access to the data on the mobile device 100. Since the service books 252 and encryption keys 254 are stored in the user data space 238, such corruption or deletion may render the mobile device 100 incapable of communicating with the wireless network 18 and/or enterprise network 30, thereby making the mobile device 100 virtually useless to the user if the user needs to retrieve new email or other data distributed over these networks. Additionally, a time may arise when the user may wish to obtain a new mobile device and copy some or all of the data in the user data space 238 to the new mobile device. If the user is away from his personal computer (e.g., travelling), the conventional means of performing a synchronization through a cradle is not available. In addition, some conventional cradle synchronizations do not save information such as the service books 252 and the encryption keys 254. This information must in some cases be obtained directly from the network service provider or system administrator, thus requiring a trip to a store or service depot in the event that the user data space 238 becomes corrupted, or require contacting a system administrator to obtain the information.

In example embodiments, the smart card reader 110 can be used to reprovision its associated mobile device 10. For example, the reprovisioning service 248 and the reprovisioning service 330 function to establish local communication between the mobile device 100 and its associated smart card reader 110 such that the data in the user data space 238 can be backed up onto the memory card 334 and/or to the reprovisioning storage space 332 and is saved for future restoration when the user encounters an unexpected or inadvertent deletion or corruption of any element of the user data space 238. This backup may be configured to back up all data including the user stored data 250, the service books 252, the encryption keys 254, and/or the user preferences 256. Alternatively, this backup may be configured to back up only the service books 252 and the encryption keys 254 such that communication can be re-established with the wireless network 18 and/or enterprise network 30. The user stored data 250 and the user preferences 256 may then be restored using the wireless connection to the enterprise network 30 or a conventional cradle synchronization, if the user stored data 250 and the preferences 256 had been previously backed up to the user's desktop computer or a location accessible to the enterprise network 30.

Figure 4:
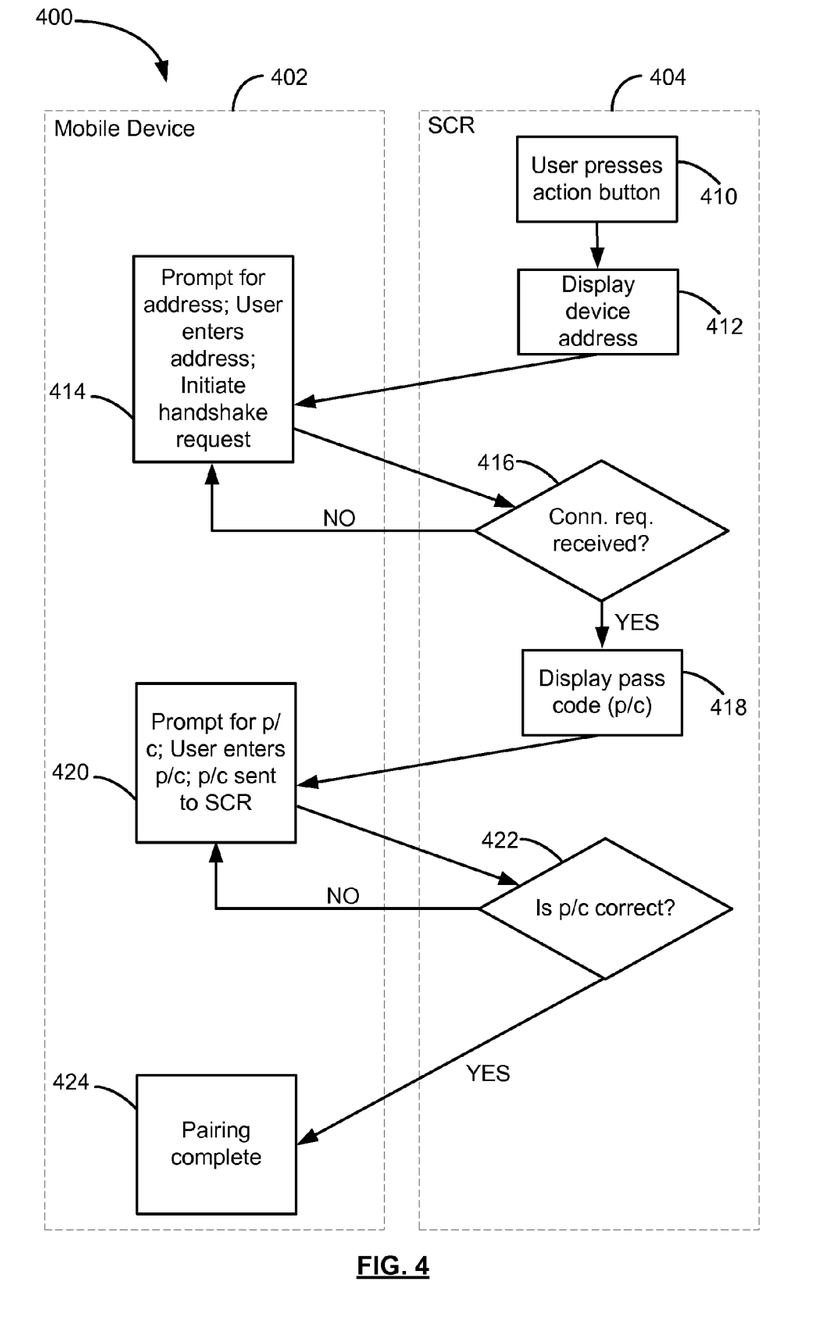
FIG. 4 shows in flow chart form one embodiment of a pairing process for use with the mobile device shown in FIG. 2 and the smart card reader shown in FIG. 3.

Reference is next made to FIG. 4, which shows in flow chart form a pairing process 400 for use with the mobile device 100 (FIG. 2) and the smart card reader 110 (FIG. 3). Since the smart card reader 110 can be used to store sensitive information (e.g., security clearances, encryption keys, service books, personal data back-up, etc.), it is important in at least some embodiments that a secure method of authentication be available to prevent unauthorized access to the smart card reader 110 and/or the memory cards 234. To initialize the pairing process (400), the user first presses the action button on the smart card reader 110 (e.g., the button 324 shown in FIG. 3) at a first step 410. The smart card reader 110 responds by displaying (e.g., on the display 312 shown in FIG. 3) the device address of the smart card reader 110 (step 412). In one embodiment, the device address may be the unique 48 bit device address assigned to each Bluetooth device that is manufactured. The user, having physical possession of the smart card reader 110, then reads the unique device address from the display 312 and enters the device address into the mobile device 100 (e.g., using the keyboard 226 to enter the address into either the reprovisioning service 248 or a pairing application existing within the software applications 242 or the operating system 240 running on the mobile device 100, shown in FIG. 2) at the step indicated by reference 414. The mobile device 100 then initiates a handshaking request (e.g., using the short range communications subsystems 232 and 320, which provides a direct communications link between the mobile device 100 and smart card reader 110) with the smart card reader 110.

After the smart card reader 110 displays the device address, it awaits the handshake request (decision step 416) from the mobile device 100. In at least some example embodiments an additional layer of security exists after handshaking occurs, requiring entry of a password, passcode or PIN. For example, in one embodiment, once handshaking is complete, the smart card reader 110 displays a pairing key or passcode (e.g., on the display 312) (step 418). The passcode may be either randomly generated or generated according to a predetermined algorithm such that the user must have physical possession of the smart card reader 110 to gain access to the smart card reader 110 (i.e., simply possessing the address of the smart card reader 110 is not sufficient to gain access, as the address is static and cannot be changed). Next, the user enters the displayed passcode into the mobile device 100 (e.g., using the keyboard 226 shown in FIG. 2), at a step indicated by reference 420. The passcode or a verification value derived from the passcode is sent back to the smart card reader 110 for verification (step 422). Once the passcode is correctly entered into the mobile device 100 and sent (either in its entirety or in the form of a verification value) to the smart card reader 110 and verified by the smart card reader 110, pairing is complete and a communication session is established between the mobile device 100 and the smart card reader 110 mobile device while the smart card reader 110 remains within range (e.g., physical proximity required for Bluetooth communications) of the mobile device 100.

Completing the pairing process 400 does not, in at least some example embodiments, grant the mobile device 100 full access to any data stored in the memory card 334 or the flash memory 314 of the Smart card reader 110—as described below, in at least some embodiments, further password or pass code entry may be required to access some or all of the functionality provided by the smart card reader 110. In a example embodiments the reprovisioning service 248 can be used to: (a) backup the contents of the user data space 238 to either the memory card 334 or the flash memory 314 (or to a combination of memory card 334 and flash memory) so that the mobile device 100 may be reprovisioned in the future in the event of data corruption or inadvertent erasure of the user data space 238; or (b) in the event that corruption or erasure of the user data space 238 has occurred, reprovision the mobile device 100 from the SCR 110.

In one embodiment, backups of the user data space 238 may be performed automatically to the smart card reader 110 periodically when an active pairing connection exists between the mobile device 100 and the smart card reader 110. In some embodiments, backups may be performed according to a predetermined schedule and in the event an active pairing session does not exist when a backup is schedules, either the mobile device 100 or the smart card reader 110 may prompt the user to initiate the pairing process 400 to perform the backup, if so desired. In another example embodiment, the user can initiate that backup process. In another embodiment the mobile electric device 100 and the smart card reader 110 may be configured to automatically pair and perform the backup according to a predetermined schedule.

Figure 5:
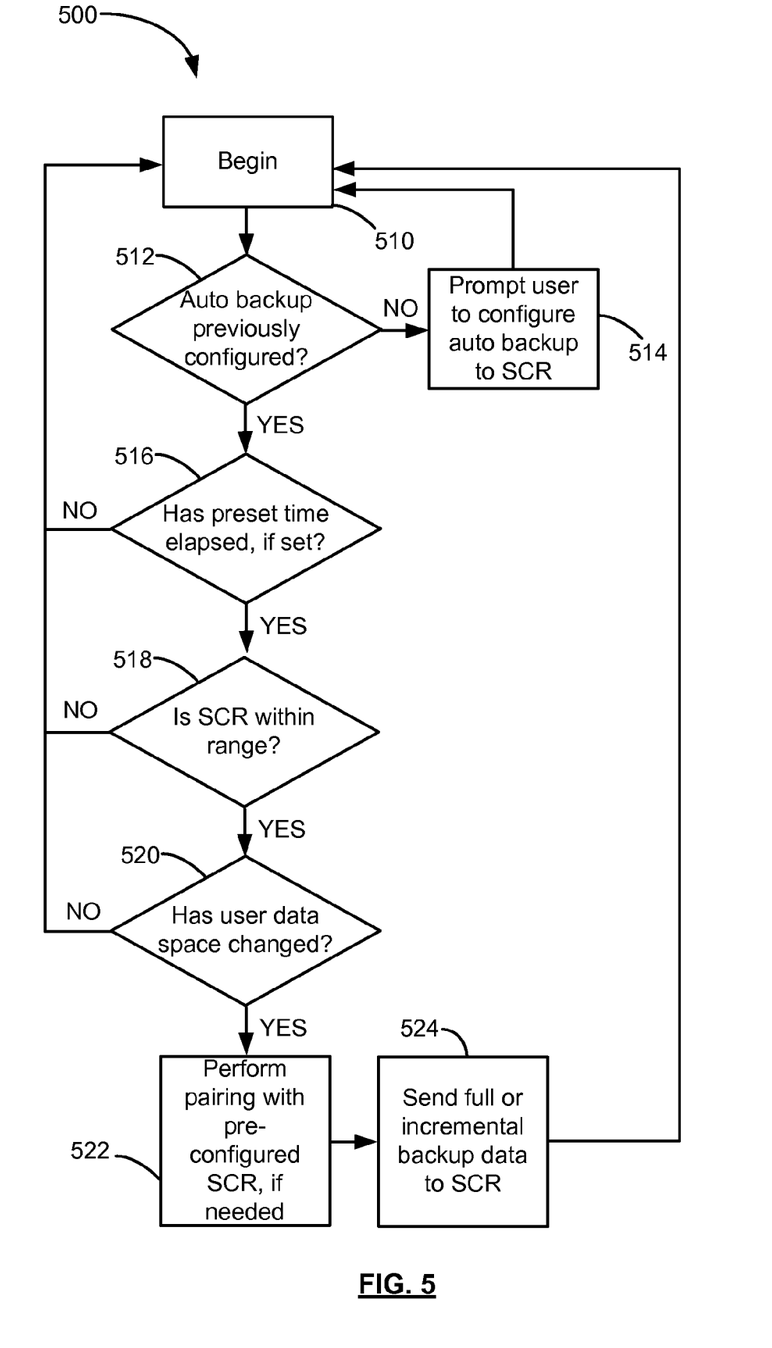
FIG. 5 shows in flow chart form an auto backup method in accordance with one embodiment.

Reference is next made to FIG. 5 which shows in flow chart form an auto backup process 500 in accordance with one example embodiment. In one embodiment, the method 500 is executed by the reprovisioning service 248 in the mobile device 100 (FIG. 2). The method 500 begins at a step 510. Next, it is determined if the auto backup function of the reprovisioning service 248 has been previously configured (e.g., by the user of the mobile device 100 and the smart card reader 110, or by the system administrator) to perform automatic backup data updates of the user data space 238 to the smart card reader 110 (step 512). If the automatic update feature has not been previously configured, the user of the mobile device 100 is prompted to configure the feature so that automatic updates may be performed in the future (step 514). At the step 514, the user may either configure the automatic update feature or disable automatic aspects of the reprovisioning service 248 such that the process 500 will not run again without an explicit request from the user. The process then returns to the beginning step 510. If the automatic update feature has been previously configured by the user, it is determined whether the user had previously selected that a preset time span must elapse before a new backup is performed and if the time span has elapsed (step 516). If a preset time span was selected and has not elapsed, the process 500 returns to the beginning 510. If a preset time span was not selected or was selected and has elapsed, it is determined if the specific smart card reader 110 that was configured to operate with the auto backup process is within range (step 518). If the smart card reader 110 is not within range, the process 500 returns to the beginning 510. If the smart card reader 110 is within range of the mobile device 100, it is determined if the contents of the user data space 238 have changed (step 520). If the contents of the user data space 238 have not changed, the process 500 returns to the step 510 and any preset time span that must occur between backups is reset. If the contents of the user data space 238 have changed, a pairing procedure is performed between the mobile device 100 and the smart card reader 110, if needed (e.g., if the mobile device 100 and the smart card reader 110 are not already paired) (step 522). In one embodiment, the reprovisioning services 248 and 330 contain provisions to prompt the user to initiate pairing between the mobile device 100 and the specific smart card reader 110 that was configured to work with the mobile device 100 for the purposes of performing the automatic backup so that minimal user intervention is required. Next, either a full or incremental backup data set is sent to the smart card reader 110 depending on preferences set by the user when the automatic backup feature was configured (step 524). Once the backup is complete, any preset time span that must occur between backups is reset and the process returns to the beginning step 510. In the case of a user-initiated backup, a process 500 similar to that shown in FIG. 5 can be used, omitting steps 512 and 516.

Figure 6:
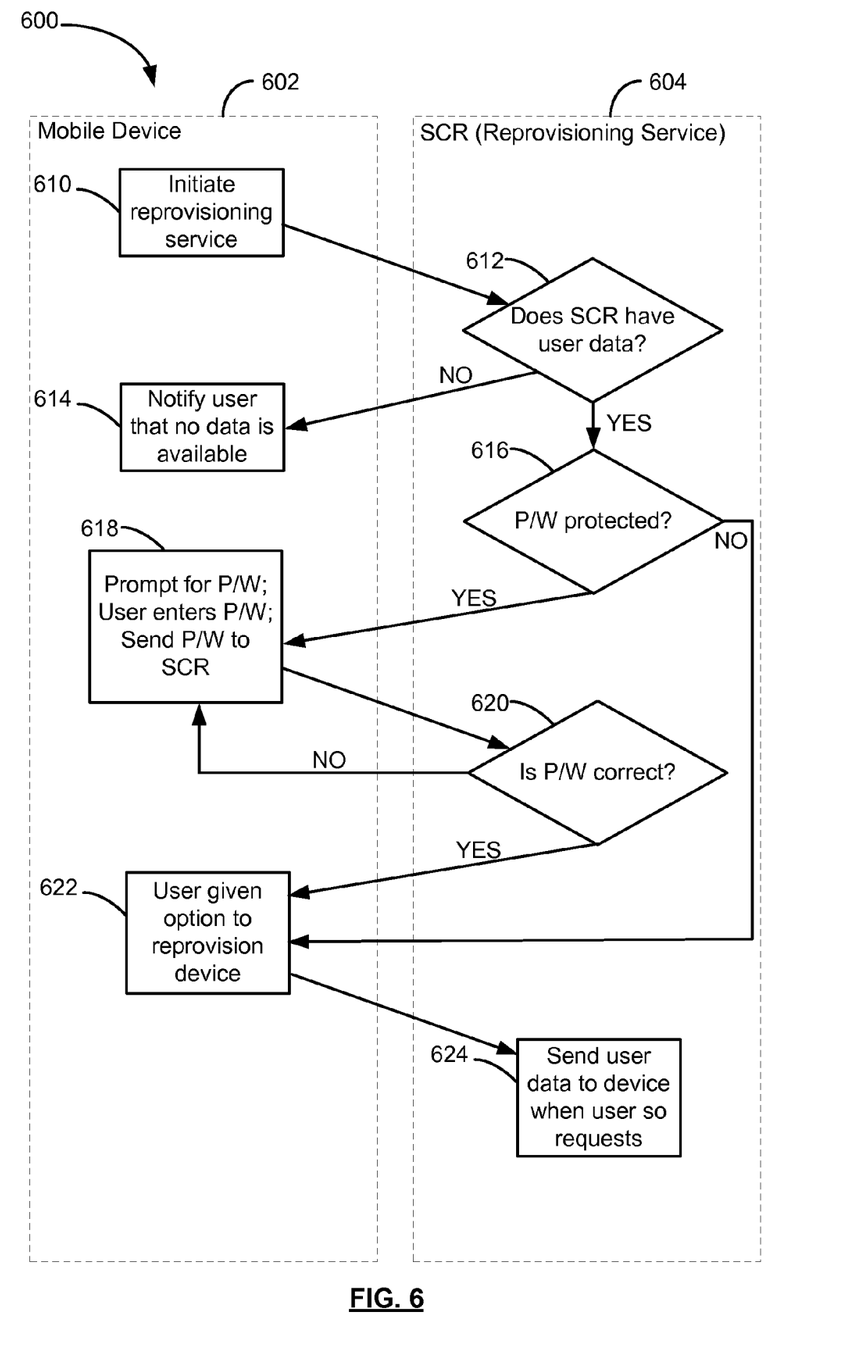
FIG. 6 shows in flow chart form a reprovisioning method in accordance with one embodiment.

Reference is next made to FIG. 6 which shows in flow chart form a reprovisioning method 600 in accordance with one embodiment. If the user of the mobile device 100 is away from the computer that is typically used for synchronization with the mobile device 100, and the user data space 238 becomes erased or corrupted, the user may be left with a functionally limited mobile device 100 that is incapable of communicating with wireless network 18 and/or the enterprise network 30 of the system 10 (FIG. 1). In such a situation, the reprovisioning method 600 may be used to reprovision the mobile device 100 following pairing process 400, thus restoring the user data space 238 back to the state the user data space 238 was in when the last backup was performed to the smart card reader 110. As a precondition to reprovisioning method 600, the mobile device 100 and smart card reader 110 will have been paired through pairing process 400 and be in a paired state when method 600 is carried out. Reprovisioning method 600 restores the service books 252 (FIG. 2) and public and private encryption keys 254 (FIG. 2) needed to re-establish communication with the system 10, as well as the user stored data 250 and the user preferences 256, if so configured. After paring between the mobile device 100 and the smart card reader 110 is established through the pairing process 400, the reprovisioning service 248 (FIG. 2) can be used to restore the user data space 238. First, the reprovisioning service 238 is initiated (step 610). In some circumstances, the microprocessor 216 may be configured to automatically check, upon completion of or as part of the pairing process 400, if corruption of the user data space 238 has occurred, and if so the device 100 may automatically commence reprovisioning process 600. Alternatively, process 600 may be commenced in response to user selection of a reprovisioning option through the mobile device 10 on completion of or during the pairing process 400. The initiation of the reprovisioning service 248 causes the mobile device 100 to communicate with the smart card reader 110 (e.g., via a Bluetooth connection) and initiates the smart card reader reprovisioning service 330. The reprovisioning service 330 checks to see if the smart card reader 110 has user data pertaining to the mobile device 100 or pertaining to the user initiating the request (step 612). If no data exists, the user is notified (e.g., on the display 210 shown in FIG. 2) that no such data exists. As indicated above, in at least some example embodiments entry of the passcode in pairing process 400 is not sufficient to allow access the mobile device 100 to have access to backup user data on the smart card reader 110. Thus, if backup data does exist (e.g., on the memory card 334 or in the reprovisioning storage space 332), the reprovisioning service 330 checks to see if a further passcode is required for reprovisioning (step 616) (in which case, a reprovisioning passcode known to the device user or other shared secret will have been previously stored on the smart card reader 110). If a reprovisioning passcode is required, the reprovisioning service 330 sends a request for passcode entry to the mobile device 100 (e.g., to the reprovisioning service 248) and the mobile device 100 prompts the user for the reprovisioning passcode (step 618). The user enters the passcode into the mobile device 100 (e.g., using the keyboard 226 shown in FIG. 2) and mobile device 100 (e.g., the reprovisioning service 248) sends the reprovisioning passcode (or a verification value derived from the passcode) to the smart card reader 110 for verification (step 620). Once the correct password is verified, the user is given the option to reprovision the mobile device 100 (step 622) (or reprovisioning can be carried out without requiring user confirmation in step 622). In some embodiments, the user would also arrive directly at the step 622 after the step 616 if the smart card reader is configured not to require a reprovising passcode. When the user chooses the option to reprovision the mobile device 100, a request is sent to the smart card reader 110 (e.g., to the reprovisioning service 330) and the smart card reader 110 retrieves the relevant data and sends it to the mobile device 100 (e.g., to the reprovisioning service 248) (step 624). The user data space 238 is then restored with the data that existed at the time of the last backup that was performed to the smart card reader 110, thus restoring the same functionality to the mobile device 100 that existed at the time of the last backup. In some embodiments, the user is not presented with the option to reprovision the device 100 at step 622, but rather reprovisioning just occurs automatically after correct password entry.

In the embodiments described above, pairing and reprovisioning communications between the mobile device 100 and its card reader 110 occurs through a short range wireless communications link. In some embodiments, such communications could alternatively be carried out through a wired link between the USB ports 224, 318 of the mobile device 100 and its associated card reader 110. Additionally, in some embodiments, the card reader 110 could be used to provision a new or replacement mobile device 110.

In example embodiments, the mobile device 100 and the smart card reader 110 are both configured to be small enough to be hand held and stored in a coat pocket or purse or belt mounted holster, for example.

The above-described embodiments of the present application are intended to be examples only. Alterations, modifications and variations may be effected to the particular embodiments by those skilled in the art without departing from the scope of the application, which is defined by the claims appended hereto.

The invention claimed is:

1. A mobile device comprising:
   a controller including at least one processor;
   a storage element coupled to the controller for storing data; and
   a short range communications system coupled to the controller for exchanging signals with a secondary device, the controller being configured to:
   send at least some of the data on the storage element to the secondary device;
   automatically determine if selected data stored on the storage element has been erased or corrupted and if so, send a request to the secondary device for the selected data; and
   receive the selected data from the secondary device.

2. The mobile device of claim 1, wherein the selected data is provisioning data.

3. The mobile device of claim 2, wherein the provisioning data includes service books including information used by the mobile device to access data services.

4. The mobile device of claim 2 wherein the provisioning data includes encryption key information, and wherein the controller is further configured to:
   provision the mobile device by storing received encryption key information on the storage element.

5. The mobile device of claim 1, wherein the secondary device is a smart card reader having a smart card for storing the data received from the mobile device.

6. The mobile device of claim 1, wherein the short range communication system is configured to use a Bluetooth™ protocol.

7. The mobile device of claim 1, wherein the controller is configured to periodically backup provisioning data stored on the storage element by transmitting updated provisioning data to the secondary device through the short range communications system.

8. The mobile device of claim 1 wherein the mobile device comprises an input device and wherein the controller is further configured to, prior to receiving the selected data from the secondary device:
   receive a reprovisioning passcode from the input device;
   and send the reprovisioning passcode to the secondary device for verification.

9. The mobile device of claim 8, wherein the controller is further configured to, prior to receiving a reprovisioning passcode, receive a request for passcode entry from the secondary device.

10. A method for restoring data on a mobile device, the method comprising:
    sending at least some data on a storage element of the mobile device to a secondary device;
    automatically determining if selected data stored on the storage element has been erased or corrupted and if so, sending a request to the secondary device for the selected data; and
    receiving the selected data from the secondary device at the mobile device.

11. The method of claim 10, wherein the selected data is provisioning data.

12. The method of claim 11, wherein the provisioning data includes service books including information used by the mobile device to access data services.

13. The method of claim 11 wherein the provisioning data includes encryption key information, and wherein the method further comprises:
    provisioning the mobile device by storing received encryption key information on the storage element.

14. The method of claim 10, wherein the secondary device is a smart card reader having a smart card for storing the data received from the mobile device.

15. The method of claim 10, wherein the data is sent and received using a Bluetooth™ protocol.

16. The method of claim 10, further comprising: periodically backing-up provisioning data stored on the storage element by transmitting updated provisioning data to the secondary device.

17. The method of claim 10 wherein the mobile device comprises an input device, the method further comprising, prior to receiving the selected data from the secondary device:
    receiving a reprovisioning passcode from the input device;
    and sending the reprovisioning passcode to the secondary device for verification.

18. The method of claim 17, further comprising, prior to receiving a reprovisioning passcode, receiving a request for passcode entry from the secondary device.

* * * * *